DATA SHIFTING APPARATUS

Filed April 3, 1964 8 Sheets-Sheet 1

INVENTORS
JAMES W. DELMEGE, JR.
RALPH W. PULVER, JR.
[signature]
AGENT

March 28, 1967 J. W. DELMEGE, JR., ET AL 3,311,896

DATA SHIFTING APPARATUS

Filed April 3, 1964 8 Sheets-Sheet 3

March 28, 1967 J. W. DELMEGE, JR., ET AL 3,311,896

DATA SHIFTING APPARATUS

Filed April 3, 1964 8 Sheets-Sheet 7

March 28, 1967 J. W. DELMEGE, JR., ET AL 3,311,896

DATA SHIFTING APPARATUS

Filed April 3, 1964 8 Sheets-Sheet 8

United States Patent Office 3,311,896
Patented Mar. 28, 1967

3,311,896
DATA SHIFTING APPARATUS

James W. Delmege, Jr., Saugerties, and Ralph W. Pulver, Jr., Red Hook, N.Y., assignors to International Business Machines Corporation, New York, N.Y., a corporation of New York Filed Apr. 3, 1964, Ser. No. 357,095
14 Claims. (Cl. 340—172.5)

The subject invention relates to electronic data shifting apparatus. More particularly, it relates to such apparatus wherein data may be shifted in either of two directions.

Data processing systems of today are characterized by a myriad of arithmetic operations transpiring within them. Digital computers, in particular, are founded on two basic operations; the addition and subtraction of binary digits. Each binary digit represents a bit of data. Processing efficiency may be increased by simultaneously handling blocks of data bits. Such blocks are referred to in industry parlance as bytes of data. The data bits and bytes are transitorily stored, between the essential processing operations, in electronic elements called registers. As a result of subsequent data processing operations, it becomes necessary to rearrange the location of the bits within these registers; this rearrangement is referred to as shifting data bits. Shifting normally takes place in one of two directions; i.e., left or right.

Prior art devices, initially facing this problem, reached the straight forward solution of moving the data bits one at a time to the desired location within a transitory storage register; sometimes the shifting took place within the register. This approach, known as the serial shifting technique, utilized a minimum of components to accomplish the shift function, but contrarily took a maximum of time. Time is a costly luxury in a modern day digital computer. The serial shifting technique was soon scrutinized and an attempt made to develop improved shifting techniques. Subsequent prior art devices utilized a "serial-parallel" shifting technique. These devices moved the data in byte-size increments, thereby simultaneously shifting all the bits within a single byte. However, only one byte of information could be shifted at a time. Although the bits within a byte were shifted in parallel, the bytes still had to be shifted serially and this took many cycles of operation to accomplish a shift operation. A certain increase in components was essential to the satisfactory operation of these later prior art devices, but time was saved. However, as technology progressed it was necessary to save still more time in order to increase the overall efficiency of the machine. The only apparent solution was to shift all data simultaneously—in truly parallel fashion—and preliminary calculations indicated that the number of components necessary to accomplish this would be exorbitant.

Accordingly, it is an object of this invention to achieve certain advantages of parallel shifting with fewer components than a completely parallel operation requires.

It is a general object of this invention to provide an improved electronic shifting apparatus capable of shifting data in either of two directions.

It is another object of this invention to provide an improved electronic shifting apparatus wherein bits of information may be simultaneously shifted in parallel and then bytes of information may be simultaneously shifted in parallel.

It is still another object of this invention to provide an improved electronic shifting apparatus having parallel data transfer operations wherein fewer levels of logic are employed than in prior art devices.

It is a further object of this invention to provide such an improved electronic shifting apparatus wherein a complete shift of data in either of two directions may be accomplished in two cycles of operation.

A more particular object of this invention is the provision of such an improved electronic shifting apparatus wherein matrices of gate circuitry are used to shift the data in parallel outside a data register as opposed to within the register.

Still another object of this invention is to provide such shifting apparatus wherein a first matrix of gate circuitry incrementally shifts the data, in parallel, a number of positions less than the number of bits in a byte, while a second matrix of gate circuitry shifts the data, in parallel, in byte-size increments.

Still another object of this invention is the provision of such electronic shifting apparatus wherein a shift left operation is accomplished by first shifting the data to the right and then overshifting the data to the left.

Briefly stated, and in accordance with one aspect of the invention, a novel data shifting apparatus is disclosed in which incoming data may be shifted to the left or to the right. Data shifting occurs in two distinct operations. First, the data is shifted incrementally a number of locations less than the number of bits in a byte; this is referred to as bit shifting. Second, the data is then shifted incrementally a number of locations equal to the number of bits in a byte or integral multiples of that number; this is called byte shifting. The data is shifted in parallel during the bit shifting operation, and it is also shifted in parallel during the byte shifting operation. Data shifting to the right, for example, comprises merely shifting the data in both bit and byte-size increments the desired number of locations to the right. However, data shifting to the left comprises an initial bit shift to the right and then a byte-size shift back to the left. In order to accomplish these operations, a matrix of bit shifting AND gates are provided for initially receiving the input data and shifting that data a certain number of bit locations to the right. A second matrix of AND gates, called byte shifting AND gates, are then provided to further shift the information in byte-size increments either to the right or to the left as required. Control circuitry coupled to both matrices of AND gates selects and activates the necessary elements to accomplish the bit and byte shifting operations.

The apparatus claimed offers the distinct advantage of accomplishing data shifting with significantly fewer steps than with prior art apparatus. Further, the data may be shifted not in one direction alone, but in one of two directions. A maximum of two cycles is required to accomplish any desired shifting operation. The data is shifted in byte-size increments as well as bit-size increments to insure precision shifting. A minimum of additional components is required and their cost is more than compensated by the time saved. Simple control circuitry may be utilized with this apparatus. The data shifting takes place external to a working register, thereby not interfering with other operations within the processing unit. A fast, versatile and yet substantially economical data shifting apparatus is presented here.

The foregoing and other objects, features and advantages of the invention will be apparent from the following more particular description of the invention as illustrated in the accompanying drawings.

Before describing a particular embodiment of the subject invention, certain items should be noted. The inventive concept may be practiced with a system employing a data word having any given number of bits. Further, there need be no limitation on the number of bits within a byte. Certain modifications to the circuitry described and shown in the particular embodiment would be necessary to accommodate changes in word length and byte-size; these would be within the capability of one skilled in the art. However, for convenience and clarity, the following description of the structure and operation of the structure will be given with reference to a twenty-four bit word of information and a byte comprising eight bits. Further, the invention may be practiced with either voltage level or pulse activated components.

D.C. levels or pulses representing binary information are positive when representing binary 1 and negative when representing binary 0. Throughout the drawings, arrowheads are employed to indicate the direction of information flow or the direction of control for D.C. or pulse signals, and signals going to a circuit may be shown connected to any portion of the block representation of the circuit. A single arrowhead connected to the corner or edge of one of a series of connected block representations may be assumed to be applied to all circuits in the series. Numerals enclosed within circular portions of cables indicate the number of conductors in the cable.

*Detailed description*

Figure 1:
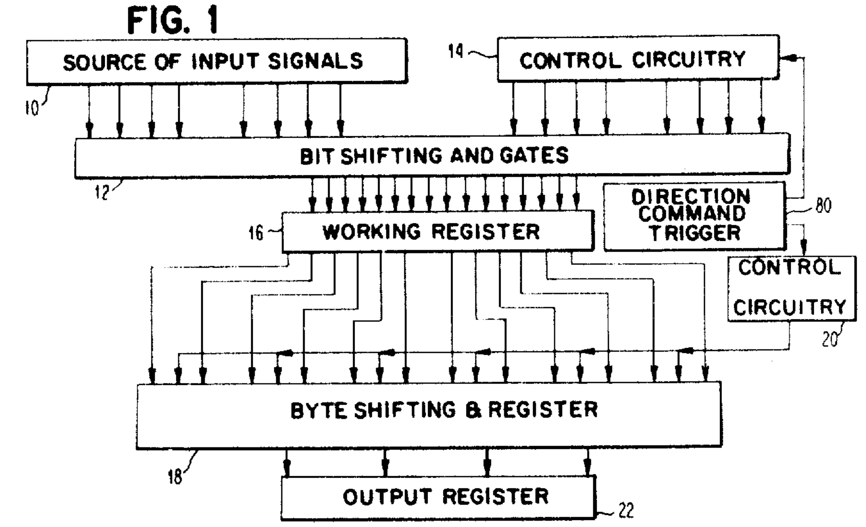
FIG. 1 shows the basic arrangement of components to accomplish the bidirectional shifting of data.

Referring now to FIG. 1, a system diagram of the essential circuitry is shown and will be described in a general way. This system, incidentally, would be the same regardless of the word length or bit-size employed. Input data signals are supplied from source 10 to a matrix of bit shifting AND Gates 12; these gates simultaneously shift the incoming data a selected number of locations less than a byte to the right. Direction command trigger 80 provides a conditioning pulse to control circuitry 14; that pulse indicates the direction that the data is to be shifted. Control circuitry 14 provides conditioning pulses to AND Gates 12. Certain AND Gates 12 are thereby conditioned so as to accomplish the desired bit shifting operation as more fully described hereinafter. The outputs from bit shifting AND Gates 12 pass on to working register 16. Working register 16 comprises a number of OR circuits and serves as a transitory storage location for the partially shifted data signals. In order to prevent the loss of essential digits during the shift left operation (which comprises an overshift to the right) working register 16 has more OR circuits than the number of bits in a word length. More precisely, the extra number of OR circuits equals one less than the number of bits in a byte. Outputs from working register 16 are applied to a matrix of byte shifting AND gates 18. Control circuitry 20, having been conditioned by a signal from direction command trigger 80, conditions selected ones of AND Gates 18 to perform either a byte shift left or a byte shift right operation. Byte shifting may take place in discrete combinations of bytes; i.e., one byte to the left, or two bytes to the left, or three bytes to the right, etc. As a result of the above operations, the data leaving the byte shifting AND Gates 18 has been shifted the desired amount. The data is therefore provided to an output register 22 comprising a plurality of OR circuits equal in number to the number of bits in the original word length. The bits of information, or data bits, are then available for further processing within the data processing machine.

Figure 2:
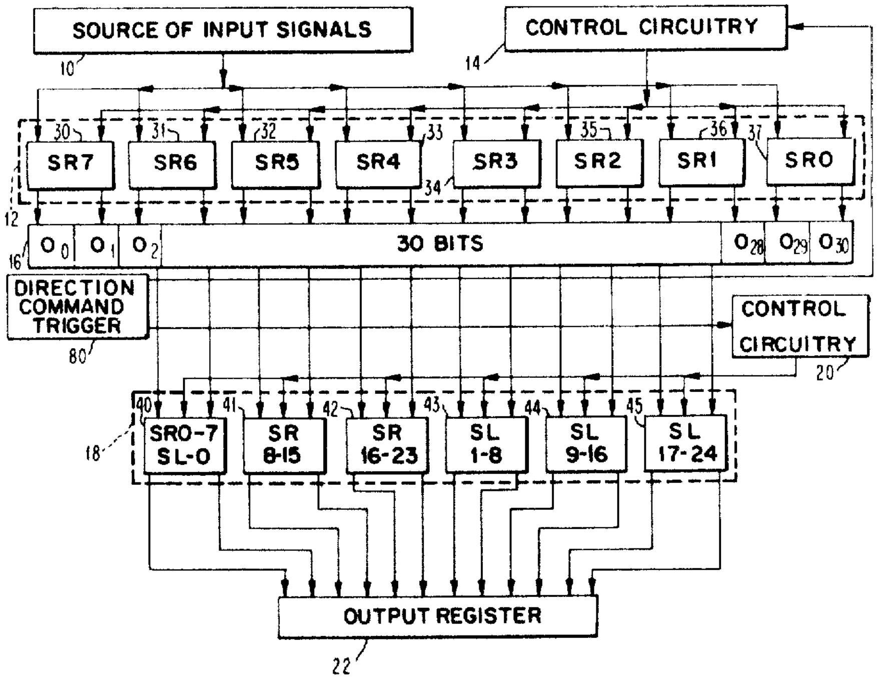
FIG. 2 shows, in more detailed form, the necessary component array to practice this invention with a twenty-four bit word.

Turning now to FIG. 2, which is more detailed than FIG. 1, a system diagram of the structure necessary for operation with a twenty-four bit word of information is shown. The basic apparatus of FIG. 1 may be recognized by the corresponding numbers; for instance, bit shifting AND gate matrix 12 is shown in dotted fashion, as is byte shifting AND gate matrix 18. Bit shifting AND gate matrix 12 comprises a number of individual AND gate matrices 30, 31, 32, 33, 34, 35, 36, 37. Each AND gate matrix 30–37 inclusive comprises a number of AND gates equal to the number of bits in the word length; in this example, twenty-four gates. Further, each AND gate matrix 30–37 inclusive shifts the incoming data a different number of bit positions, and this number is less than a byte length. For instance, AND gate matrix 37 performs the shift right zero position function; AND gate matrix 34 performs the shift right three positions function; while AND gate 30 performs the shift right seven positions function. The particular bit shifting AND gate matrix 30–37 to be operative during a given cycle is selected by direction command trigger 80 and control circuitry 14, which conditions the gates within the particular AND gate matrix. Each of the individual AND gate matrices 30–37 provide their outputs to the OR circuits in working register 16 which momentarily accepts the partially shifted input data signals. In order to compensate for the overshift to the right, which is necessary to effect a shift left operation, working register 16 must have more OR circuits than the number of bits in a word length. Accordingly, for a twenty-four bit word length, having eight bit bytes, working register 16 will have a seven bit extension; this is shown by the additional seven OR circuits tacked onto the right end of working register 16.

Continuing on with FIG. 2, byte shift AND gate matrix 18 is shown in dotted lines. Byte shift AND gate matrix 18 comprises, in turn, a number of matrices of AND circuits for shifting the information either to the left or to the right in byte-size increments. These individual byte shift matrices are numbered 40, 41, 42, 43, 44, and 45. Each matrix 40–45 inclusive comprises a discrete number of AND gates, but each of the matrices does not have the same number of AND gates. This will be described more fully and become apparent in connection with FIGS. 3 and 4*a*–4*f*. Generally speaking, though, the number of AND gates in a particular byte shift matrix is an inverse function of the number of bit spaces that the byte shift matrix can move the information. Each of the byte shift matrices 40–45 inclusive receive inputs from selected ones of the OR circuits present in working register 16; each of the byte shift matrices is alo selectively conditioned by signals available from control circuitry 20 functioning in cooperation with direction command trigger 80. As the information comes out of the individual byte shift matrices 40–45 inclusive, it has been shifted either left or right by a desired amount. The outputs from byte shift matrices 40–45 lead to an output register 22. Output register 22 has a number of OR circuits equal to the number of bit positions in a word length. The information present in output register 22 is available for further manipulation within the data processing machine.

Figure 3:
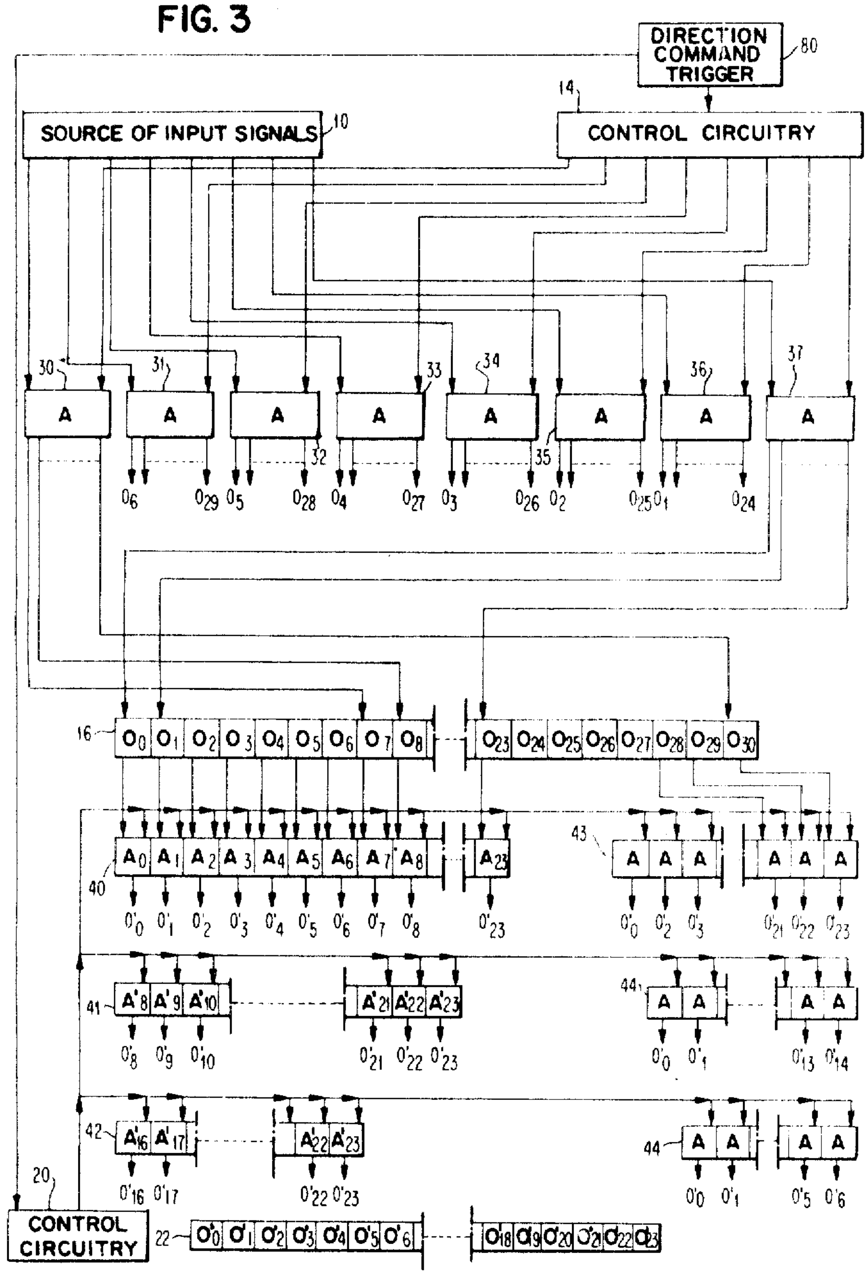
FIG. 3 shows, and labels, the interconnections necessary between the components set forth in FIG. 2.
Figure 4A:
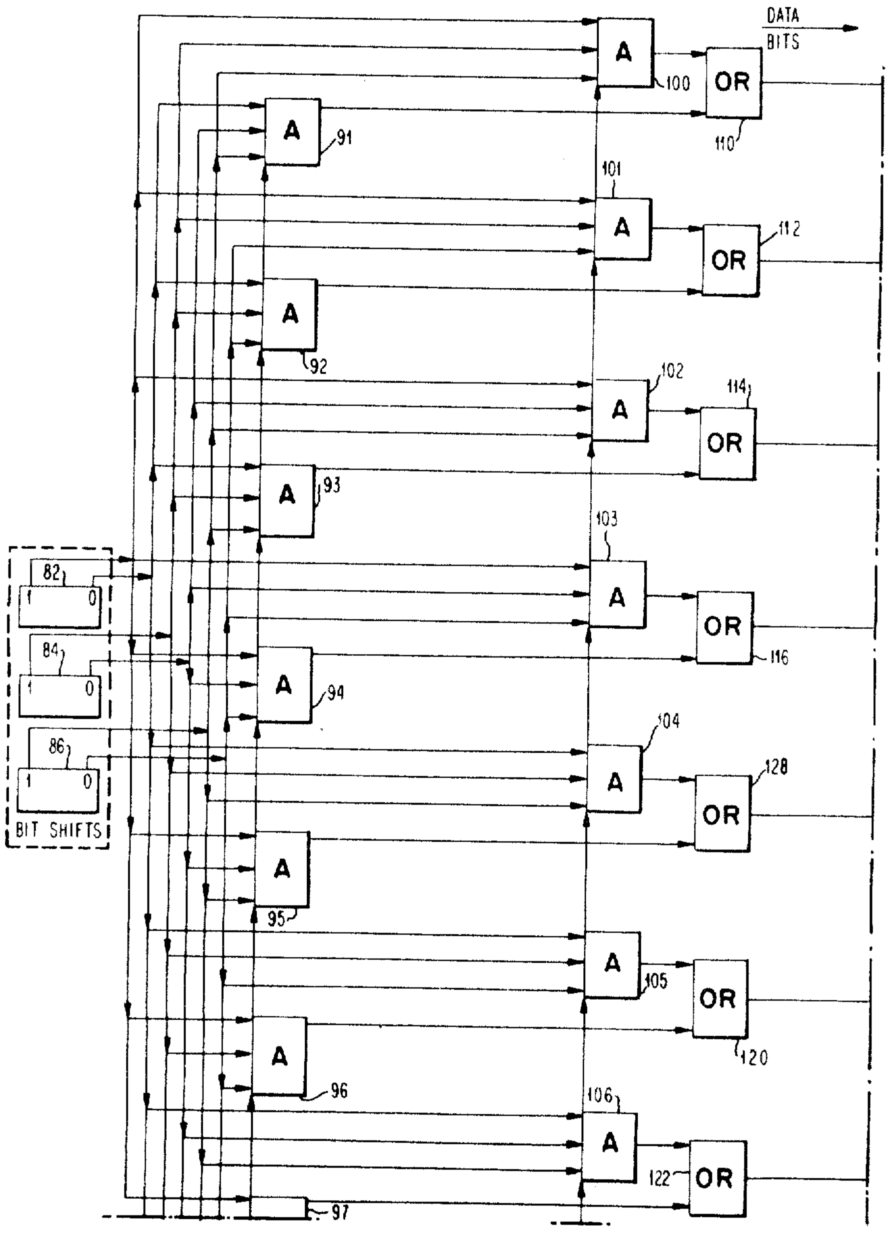
FIG. 4 is a composite of FIGURES 4*a*–4*f* which are a detailed logic diagram of the apparatus necessary to accomplish bidirectional shifting when a twenty-four bit word of information is to be shifted.
Figure 4B:
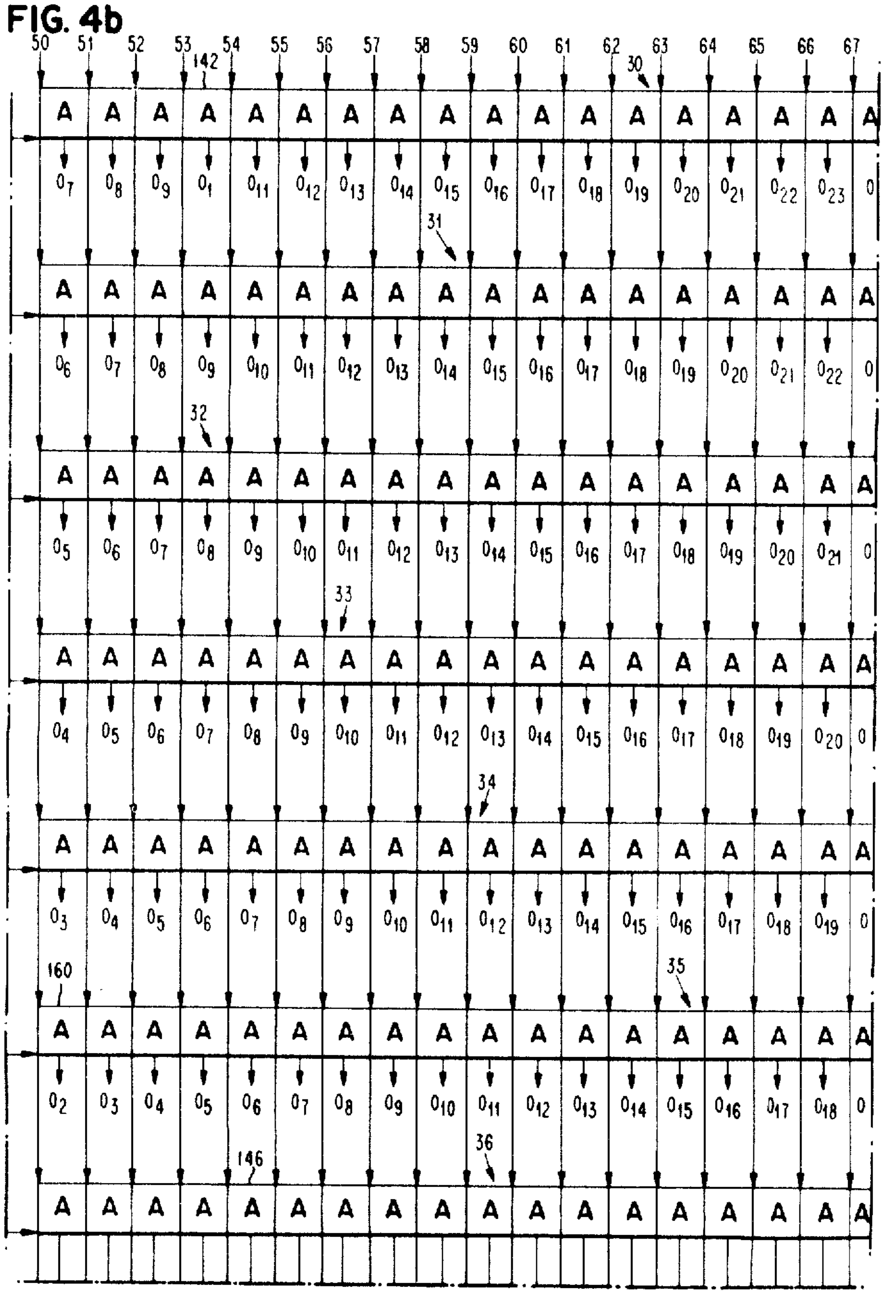
Figure 4C:
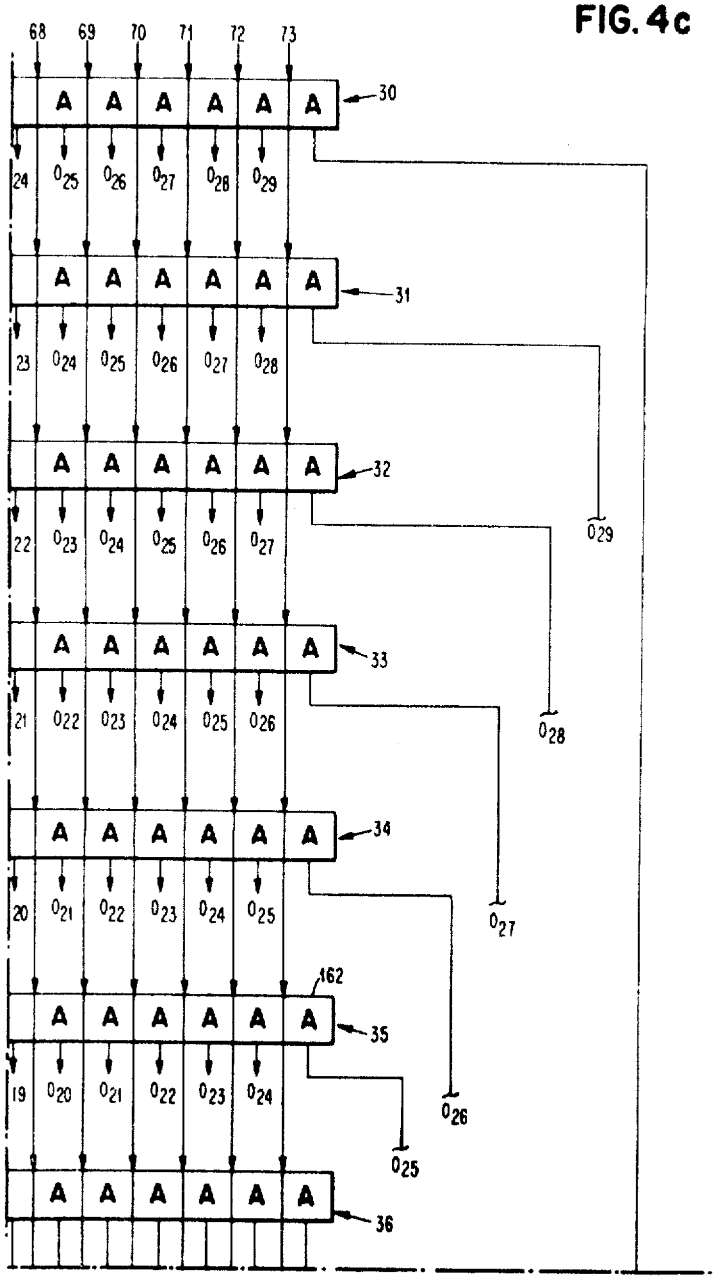
Figures 4, 4D:
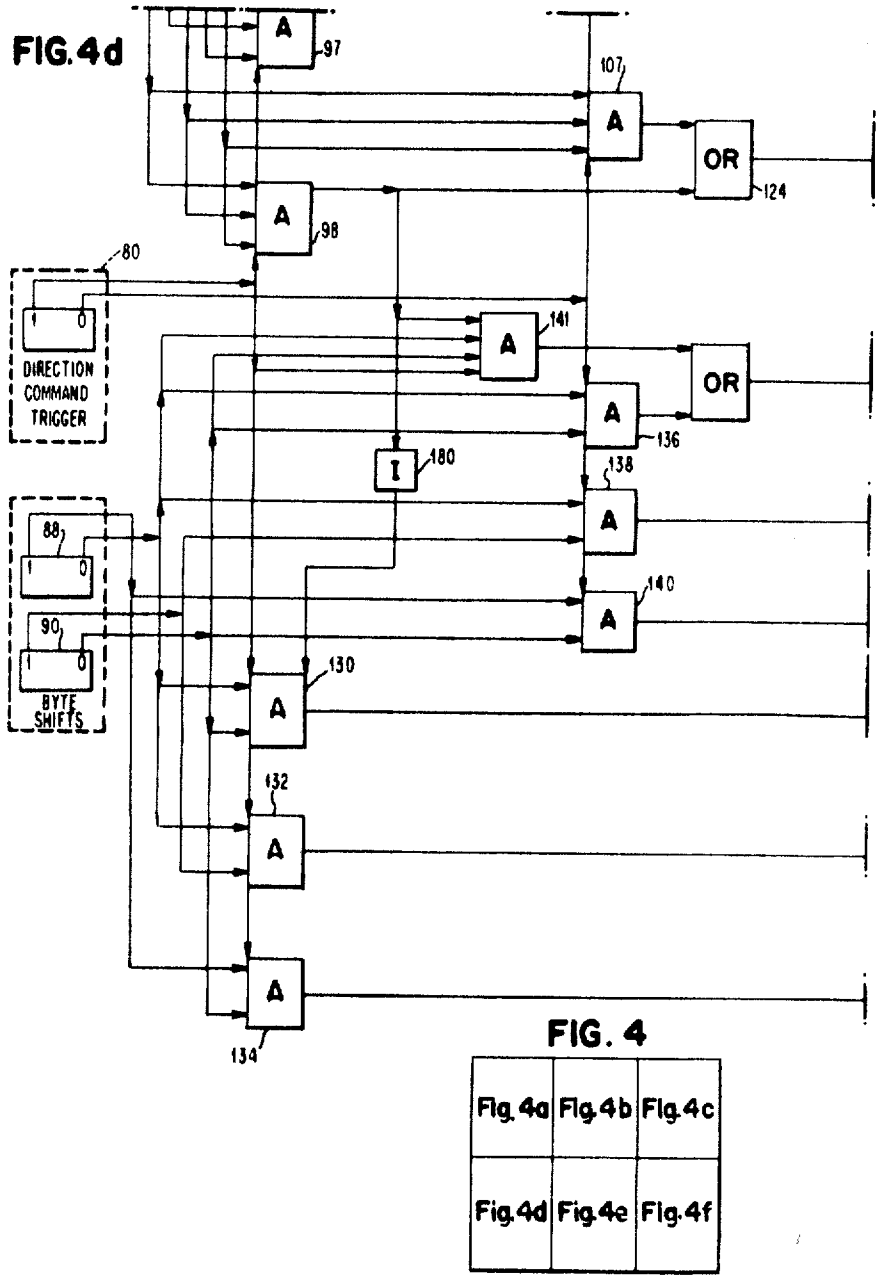
Figure 4E:
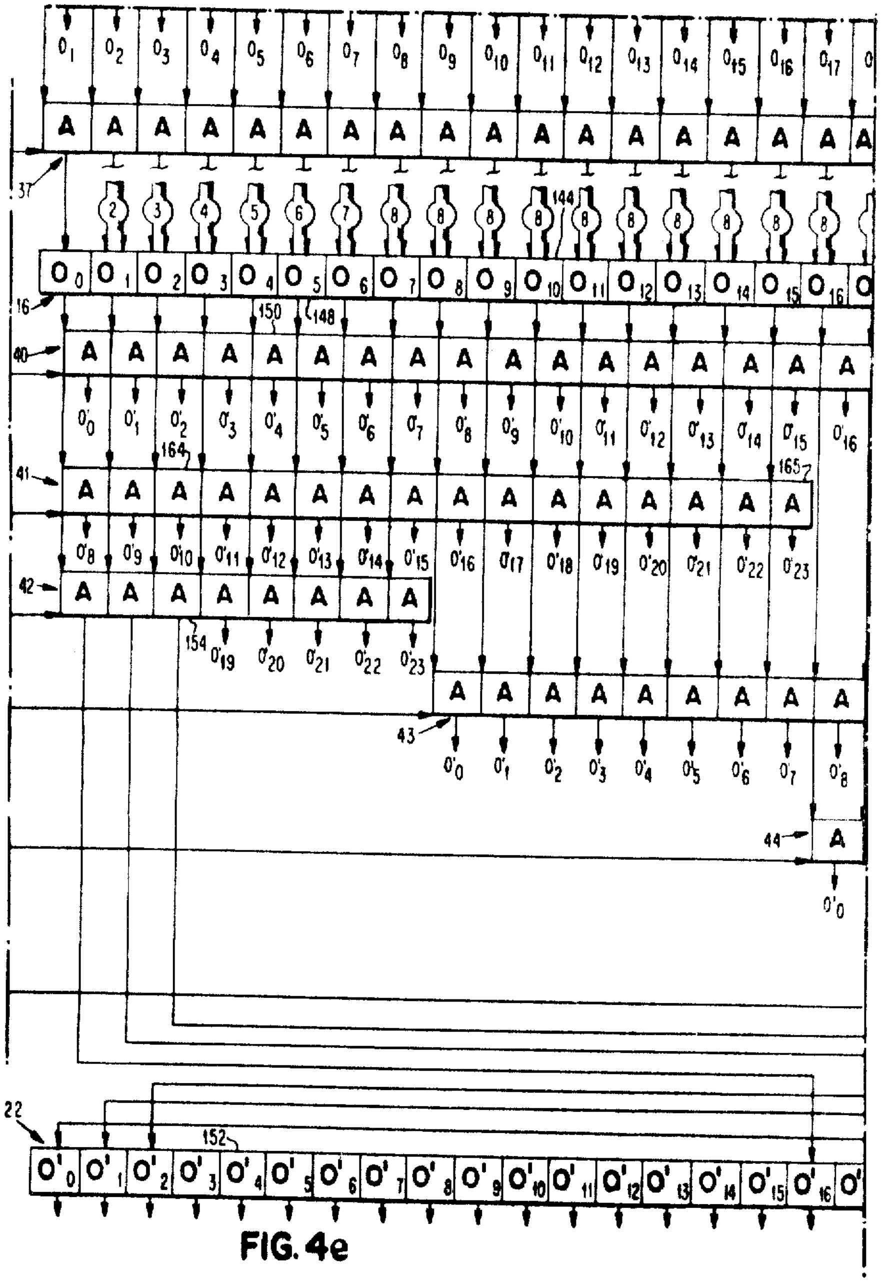
Figure 4F:
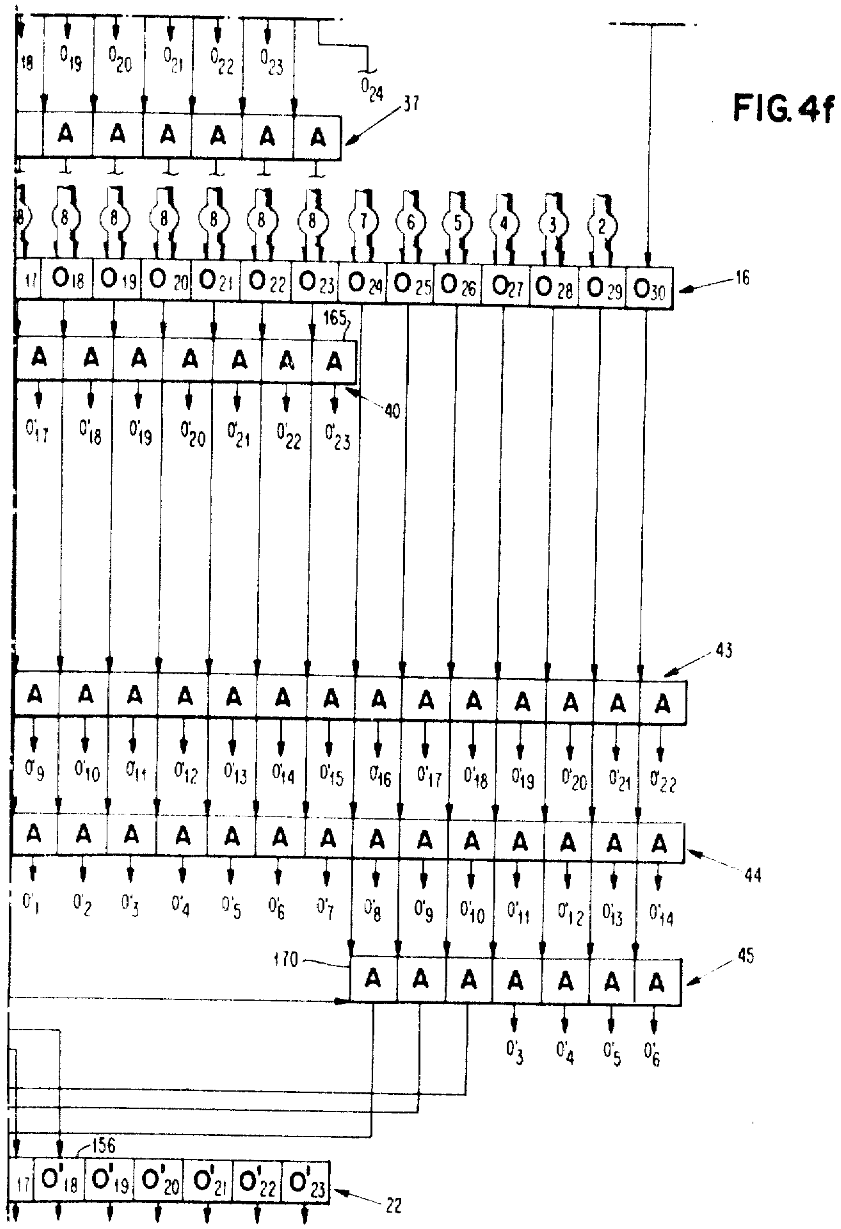

FIG. 3 shows the structure of FIG. 2 in even more detail, and is directed to accomplishing bidirectional shifting of a twenty-four bit word. FIG. 3 also shows the interconnections between the various elements of the necessary circuitry.

With particular reference to the individual bit shift AND gate matrices 30–37 present in the uppermost portion of FIG. 3, it can be seen that each such AND gate matrix provides outputs to individual OR circuits in working register 16. Further, the particular OR circuits to which outputs from an individual AND circuit matrix lead are labeled on the output arrow. For instance, AND circuit matrix 31 provides outputs to OR circuits 6 through 29 ($O_6$ to $O_{29}$) in register 16; AND gate matrix 34 provides outputs to OR circuits 3 through 26 ($O_3$ to $O_{26}$) in register 16; while AND gate matrix 37 provides outputs to OR circuits 0 through 23 ($O_0$ to $O_{23}$) in register 16.

As noted before, the particular AND circuit matrix 30–37 to be acivated is selected by direction command trigger 80 and control circuitry 14, which conditions one particular AND gate matrix from matrices 30–37. Conditioning of a selected AND gate matrix (for example, matrix 33) coupled with the application of the data input signals from source 10 to that AND gate matrix results in a series of output pulses from that matrix; in this instance, output pulses are provided to OR circuits 4 through 27 ($O_4$ to $O_{27}$) in register 16. It should further be noted that each of the bit shift AND gate matrices 30–37 has the same number of AND circuits; namely, as many circuits as there are bit positions in the word length or, in this instance, twenty-four AND circuits.

With continued reference to FIG. 3, byte shift AND gate matrices 40–45 inclusive are shown in greater detail than in both FIGS. 1 and 2. Byte shift matrix 40 which is capable of executing the shift right zero byte operation as well as the shift left zero byte operation (a distinction is made between them for programming purposes) comprises twenty-four AND gates. Each of these AND gates provides a single output to one of the OR circuits in output register 22; the first AND gate $A_0$ providing an output to the first OR circuit $O'_0$, the second AND gate $A_1$ providing an output to the second OR circuit $O'_1$ and so on down to the twenty-fourth AND gate $A_{23}$ and twenty-fourth OR circuit $O'_{23}$. Byte shift matrix 41 has sixteen AND gates and each of these sixteen AND gates provides an input to an associated OR circuit in output register 22. The output from the first AND gate $A'_8$ in byte shift matrix 41 goes to OR circuit $O'_8$, while the outputs from succeeding AND circuits go to succeeding OR circuits ending with the output from the last AND gate $A'_{23}$ going to the last OR gate $O'_{23}$. Likewise, byte shift matrix 42 comprises eight AND gates and their outputs are provided as inputs to OR circuits $O'_{16}$ through $O'_{23}$ in output register 22. Byte shift matrix 41 is connected to perform the shift right one byte operation, while byte shift matrix 42 can exercise the shift right two bytes operation, when properly conditioned by control signals from control circuitry 20.

FIGS. 4*a*–4*f* of the drawings are more detailed than the circuitry referred to in FIGS. 1, 2 and 3. FIGS. 4*a*–4*f* show, among other things, a typical arrangement of control circuitry for activating bit shift AND gate matrices 30–37 inclusive and byte shift AND gate matrices 40–45 inclusive. The data bits (from source 10 shown in FIGS. 1, 2 and 3) which are to be shifted are provided at conductors 50–73 inclusive. Working register 16 is shown in detail, and the number of inputs available to each of the OR circuits $O_0$ to $O_{30}$ inclusive comprising working register 16 is delineated. Output register 22 is similarly shown and comprises OR circuits $O'_0$ to $O'_{23}$ inclusive.

With continued reference to FIGS. 4*a*–4*f*, the control circuitry (previously referred to as 80, 14 and 20 in FIGS. 1, 2 and 3) which dictates the function performed by the apparatus is set forth in detail. Direction command trigger 80 determines whether to shift left or shift right. A signal present on the "one" side of trigger 80 indicates that the apparatus should operate in the shift left mode, while a signal available from the "zero" side of trigger 80 conditions the apparatus for a shift right operation. Any conventional trigger may be employed for this purpose. Coacting with the signals available from trigger 80 are those available from the bit shift position control triggers 82, 84, 86 and the byte shift position control triggers 88, 90. Bit shift triggers 82, 84, 86 provide outputs having a weighted binary value; i.e., the output (zero or one) of trigger 82 equals the coefficient of $2^2$, the output of trigger 84 is the coefficient of $2^1$, and the output of trigger 86 is the coefficient of $2^0$. Since it is necessary to generate a command indicating that the bits should be shifted either zero positions or all the way up to seven positions, three triggers, whose outputs represent binary values, may accomplish this. For instance, if triggers 82, 84, 86 all have an output on their zero terminal, this is equal to a shift zero bit positions command, while if triggers 82 and 84 have an output on their one terminal and trigger 86 has an output on its zero terminal this is equivalent to a shift six bit positions command. Outputs from bit shift position control triggers 82, 84, 86 are applied to AND circuits 91, 92, 93, 94, 95, 96, 97, 98 as well as 100, 101, 102, 103, 104, 105, 106, and 107. AND circuits 91–98 inclusive are conditioned by a shift left signal available from trigger 80, while AND circuits 100–107 inclusive are conditioned by a shift right signal available from trigger 80. Outputs from AND circuit 91 as well as AND circuit 100 are applied to OR circuit 110. Outputs from AND circuit 92, as well as AND circuit 101 are applied to OR circuit 112. In a similar fashion outputs from the succeeding pairs of AND circuits are applied to the remaining OR circuits 114, 116, 118, 120, 122, until, finally, outputs from AND circuits 98 as well as AND circuit 107 are applied to OR circuit 124. Each of the OR circuits 110–124 inclusive provides an output pulse which, in turn, conditions all the AND gates in an associated one of bit shift AND gate matrices 30–37 inclusive. For example, an output from OR circuit 110 serves to condition the AND gates in AND gate matrix 30; an output from OR circuit 120 serves to condition the AND gates in AND gate matrix 35; while an output from OR circuit 124 serves to condition the AND gates in AND gate matrix 37.

Now that the structure for operating the bit shift AND gate matrices 30–37 inclusive has been set forth, the structure for operating the byte shift AND gate matrices 40–45 inclusive will be presented with continued reference to FIGS. 4*a*–4*f*. It may be remembered from the previous description that the entire apparatus is capable of shifting bytes of information as well as bits of information. Further, the bytes of information may be shifted either to the left or to the right. Data may be ultimately shifted a maximum of three bytes in any given direction; i.e., the least significant digit of the shifted data can never be shifted more than twenty-four locations in either direction. Two byte shift triggers 88, 90 are provided to initiate the signal indicative of the amount of byte shift to be accomplished by the remaining byte shift circuitry. Byte shift triggers 88, 90 also have weighted binary outputs. If byte shift triggers 88 and 90 both have a zero level output this indicates that a shift of one byte should be accomplished; if byte shift trigger 88 has a zero output and byte shift trigger 90 has a one output, this indicates that a shift of two bytes should be accomplished; while finally if byte shift trigger 88 has a one output and byte shift trigger 90 has a zero output, this indicates that a shift of three bytes should be accomplished. The direction of byte shifting is determined by making a signal available simultaneously (to those from byte shift triggers 88 and 90) from direction command trigger 80. Thus, signals are made available from byte shift triggers 88, 90 to AND circuits 130, 132, 134, 136, 138, 140 and 141. AND circuits 130, 132, 134 and 141 which initiate the byte shift left operation are conditioned by a shift left signal from direction command trigger 80. AND circuits 136, 138, 140, which initiate the shift right operation, are conditioned in a similar manner by a shift right signal available from direction command trigger 80.

Having set forth the control circuitry in detail, the remainder of FIGS. 4*a*–4*f* will be described. It can be seen that there are twenty-four AND circuits in each of the bit shift AND gate matrices 30–37. These matrices must always have a number of AND circuits equal to the number of bits in the word of information. Each of the AND circuits in matrices 30–37 inclusive receive inputs upon conductors 50–73 from source 10 and have their outputs labeled. Looking more particularly, and by way of example, at bit shifting AND gate matrix 30, it can be seen that each AND circuit therein receives a conditioning input signal from OR circuit 110 if the latter circuit has received an input. Further, each AND circuit receives one input from an associated one of the data input lines 50–73. Each AND circuit in matrix 30 provides an output to an associated one of the OR circuits in working register 16. For example, the fourth AND circuit 142 provides an output to the eleventh OR circuit 144 in working register 16. Taking another example, the output from the fifth AND circuit 146 in matrix 36 provides an input to the sixth OR circuit 148 in working register 16. Some of the OR circuits in working register 16 as will become apparent from the description of the operation will necessary receive more inputs than others. The number of inputs from the AND circuits in matrices 30–37 provided to each OR circuit in working register 16 is labeled on the arrow serving as the input lines to those OR circuits.

With continued reference to FIGS. *4a–4f*, it may be recalled that the data has only been shifted in increments less than a byte when it is inserted in working register 16. Therefore, it is necessary that working register 16 provide outputs to other circuitry capable of shifting the data further if necessary. Accordingly, a single output is available from each OR circuit within working register 16. These outputs from the OR circuits within working register 16 serve as inputs to the byte shifting AND gate matrices 40–45 inclusive.

The number of AND gates within a particular one of the byte shifting AND gate matrices 40–45 inclusive is inversely related to the number of positions which that byte shift gate matrix can shift the entering data. For example, byte shift AND gate matrix 42, which can shift data to the right two bytes at a time, has fewer AND gates than byte shift AND gate matrix 41 which shifts data to the right only one byte. As mentioned before, each AND gate in byte shift AND gate matrices 40–45 is conditioned by a signal available from the byte shift control circuitry (for instance, AND circuit 130, 132, 134, etc.) Each AND gate in any one of the matrices 40–45 provides an output to one of the OR circuits in output register 22. The particular OR circuit ($O'_0$ to $O'_{23}$) receiving the output from an AND circuit is labeled beneath the particular AND circuit. For example, with reference to byte shift AND gate matrix 40, the fifth AND circuit 150 provides an output which serves as an input to the fifth OR circuit 152 ($O'_4$) in register 22. Likewise, the third AND circuit 154 in byte shift AND gate matrix 42 provides an output which serves as an input to the nineteenth OR circuit 156 ($O'_{18}$) in register 22. Finally, each of the OR circuits in output register 22 has an output available whenever an input has been impressed upon it. This output may be utilized in further manipulations within the data processing machine.

The necessary structure to practice this invention has now been set forth. The coaction of the structure will now be described in random examples.

*Operation*

In order to more fully explain the invention, a description of the operation of the apparatus will be presented. In this description, the comments addressed to FIGS. 1, 2 and 3 will be necessarily be brief, but more time will be spent on a detailed explanation of FIGS. *4a–4f*.

Before entering into examples, it should be recalled that the data entering this novel apparatus may be shifted in either of two directions. A shift to the right will be accomplished by merely transferring the data in that direction in bit and/or byte-size increments. However, as noted previously, a shift to the left really comprises an overshift to the right within the bit shifting area, followed by a byte-size shift to the left. For a twenty-four bit word, then, the shift left operation becomes the twenty-four's complement of the shift right operation. This will become more apparent when the detailed description of FIGS. *4a–4f* is reached.

With reference to FIG. 1, input pulses available from source 10 are applied simultaneously with pulses available from control circuitry 14 (conditioned by direction command trigger 80) to bit shifting AND gates 12. If required, the incoming information is shifted to the right a certain number of locations less than the number of locations (or bits) in a byte of information. The shifted information is then passed on from bit shifting AND gates 12 to working register 16. Outputs are then available from working register 16 and are provided, simultaneously with signals from control circuitry 20 (also conditioned by direction command trigger 80), to the various byte shifting AND gates 18. There, if required, the information will be further shifted either right or left a number of locations equal to integral multiples of the bytes. Having passed through bit shifting AND gates 12, working register 16, and byte shifting AND gates 18, the information has now been moved either right or left a desired number of locations. It is then conveyed to output register 22 where it is available for further operations within the data processing machine.

Turning now to FIG. 2, it can be seen that the structure shown in FIG. 1 has been repeated only in more detail. It thus becomes more apparent that, as the data bits are shifted to the right upon passing through bit shift AND gate matrices 30, 31, 32, 33, 34, 35, 36, 37, they are made available to the individual OR circuits $O_0$ to $O_{30}$ in working register 16. Further, for a twenty-four bit word the seven bit extension of working register 16 is shown. This extension prevents the loss of significant data bits when the overshift to the right occurs during a shift left operation. The information passes from working register 16 to selected ones of the byte shift AND gate matrices 40–45 inclusive. After being operated upon within that series of matrices, the information is then fed to output register 22.

FIG. 3 shows the apparatus in even more detail and labels the interconnections between the various elements. The simple example of shifting the input information nine bits to the right will be considered. Since there are eight bits per byte, this will require shifting the data one byte to the right plus one bit to the right. Therefore, upon application of the data bits to bit shift AND gate matrices 30–37 inclusive, bit shift AND gate matrix 36 will be conditioned by a control signal from control circuitry 14 which has already been conditioned by a shift right signal from direction command trigger 80. Bit shift AND gate matrix 36 is responsible for the shift right one bit operation. The AND circuits within matrix 36, having been conditioned, and having received an input from the data bits, will provide an output to individual OR circuits in working register 16. Or circuits $O_1$ through $O_{24}$ will receive these outputs as an input. The data has now been shifted one location to the right. It is still necessary to shift it one byte to the right in order to complete the shift right nine bits operation. Byte shift AND gate matrix 41 is responsible for the shift right one byte operation. Accordingly, outputs available from OR circuit $O_1$ through $O_{24}$ in working register 16 will be applied to byte shift AND gate matrix 41 simultaneously to the application of a control signal from control circuitry 20 (and control circuitry 20 has been conditioned by a shift right signal from direction command trigger 80). The AND circuits within byte shift AND gate matrix 41, having been conditioned by a control signal, will provide an output signal to individual OR circuits within output register 22. More particularly, the AND circuits within AND gate matrix 41 will provide output signals to OR circuits $O'_8$ through $O'_{23}$. The shift right nine bits operation has now been completed and demonstrated. The information is available within output register 22 for further operations within the data processing machine.

With reference now to FIGS. *4a–4f*, several detailed examples will be presented of various shifting operations, both to the right and to the left, in order to more fully present the inventive aspects of this concept. Basic to any example presented here is the thought that the amount of shift which is to be performed in either direction is accomplished by shifting the information both in byte-size amounts and bit-size increments. The necessary instructions are generated from the control circuitry 80, 82, 84, 86, 88, 90; the bit shifting operation takes place within bit shifting AND gate matrices 30–37 inclusive; while, finally, the byte shifting operation takes place within byte shift AND gate matrices 40–45 inclusive.

Consider, by way of example, the necessity of shifting the incoming data bits ten positions to the right. This would necessitate shifting the information one byte-size increment (eight bits) to the right, as well as shifting the information two bit increments to the right. Initially, direction command trigger 80 would have a signal present on the zero side of its output; this indicates the shift right operation. That voltage signal is used to control the operation of both bit shift AND gate matrices 30–37 as well as that of byte shift AND gate matrices 40–45. Looking first at the bit shift AND gate matrices 30–37, the signal from direction command trigger 80 is applied to AND circuits 100–107 inclusive. Since it is necessary to shift the information two bit positions to the right, signals indicative of this operation must be made available from bit shift triggers 82, 84, 86. Accordingly, the output of trigger 82 will be a zero, the output of trigger 84 will be a one and the output of trigger 86 will be a zero. These outputs are applied to AND gate 105 (which has already been conditioned by the output from direction command trigger 80). Accordingly, AND gate 105, receiving the proper signals, provides an output signal to OR circuit 120. OR circuit 120 will therefore provide an output, and this is fed to the AND gates in bit shift AND gate matrix 35 thereby conditioning each of the AND gates therein. Further, each of those AND gates has received, as an input, signals on conductors 50–73 inclusive representing the input data bits. Each of the AND gates in bit shift AND gate matrix 35 will now provide an output to certain OR circuits within working register 16. The OR circuit to which each AND circuit in bit shift AND gate matrix 35 provides an input is numbered beneath the output arrow for the particular AND gate. Thus, the first AND gate 160 provides an output to OR circuit $O_2$ in working register 16 while the last AND gate 162 provides an output to OR circuit $O_{25}$. Thus, the incoming data bits have been shifted two bit positions to the right. It is now necessary to shift them eight more positions to the right in order to accomplish the necessary shift of ten positions to the right.

With continued reference to FIGS. 4*a*–4*f*, it is apparent that the further shift of eight positions to the right may be accomplished by merely shifting the information in a single byte-size increment (there being eight bits per byte). Therefore, it is necessary to activate the AND circuits in byte shift AND gate matrix 41 which accomplishes the shift right one byte function.

Accordingly, with continued references to FIGS. 4*a*–4*f*, the shift right one byte operation will be described. Byte shift AND gate matrix 41 performs the shift right one byte operation. Therefore, it is necessary to hit all the AND gates within byte shift AND gate matrix 41 with the necessary input signal. Output signals from OR circuit $O_0$ through $O_{15}$ in working register 16 are applied to byte shift AND gate matrix 41 during each cycle of machine operation. Therefore, a conditioning signal must be available from some circuit in order to activate the AND gates in matrix 41; AND circuit 138 provides this signal. In order to operate AND circuit 138, a coincidence of three signals is required. One of these signals is available from the zero terminal of direction command trigger 80; such a signal is indicative of a shift right operation. Byte shift triggers 88 and 90 provide the other two inputs. In order for the shift right one byte operation to take place, it is necessary for trigger 88 to have an output on its zero terminal while trigger 90 should have an output on its one terminal. These outputs are provided to AND circuit 138, and it provides a signal to condition each of the AND circuits within byte shift AND gate matrix 41. Thus conditioned, each of the AND circuits within byte shift AND gate matrix 41 provides an output signal. This output signal is delivered to certain OR circuits within output register 22. These OR circuits are marked beneath each output arrow from each AND circuit within matrix 41. For example, AND circuit 164 provides an output signal to OR circuit $O'_{10}$, while AND circuit 166 provides an output to OR circuit $O'_{23}$.

With continued reference to FIGS. 4*a*–4*f*, the data in output register 22 has now been shifted ten places to the right. The data bits were moved two places to the right upon passing through bit shift AND gate matrix 35. They were then moved one byte to the right, or eight more bits to the right, upon passing through byte shift AND gate matrix 41. Thus, when they appeared in output register 22 they had been moved ten places to the right.

Further examples of the shift right operation will not be given. However, it is apparent that within two cycles of operation the data can be shifted any amount to the right up to and including twenty-four bit locations. This is accomplished by parallel shifting the data, first in bit-size increments, and then in byte-size increments.

The shift left operation is slightly more complex, but can still be accomplished within two cycles of operation. In essence, to shift information to the left, it is necessary to overshift the information to the right a certain number of bits so that upon subsequent shifting to the left a certain number of byte-size increments, the data will end up in the proper locations of register 22. Every shift left represents the twenty-four's complement of the shift right operation. The shift left operation will be explained by means of several examples.

The apparatus of FIGS. 4*a*–4f can be used to practice a shift left operation. Perhaps the most simple example is that of shifting left one bit position. This requires shifting the information seven bits to the right as it passes through bit shift AND gate matrices 30–37 inclusive. Then, a shift left one byte, or eight bits, must be effected as the information flows through byte shift AND gate matrices 40–45 inclusive. At the beginning of the operational cycle, the data bits are present as input signals on conductors 50–73 inclusive. Direction command trigger 80 has an output available on its one side; this is indicative of a shift left operation. The signal available from trigger 80 is applied to AND circuits 91–98 inclusive. This signal from trigger 80 serves to condition these AND circuits. Bit shift triggers 82, 84, 86 must have a particular combination of outputs, indicative of the value one, and these outputs will be applied to AND circuits 91–98 inclusive. If bit shift trigger 82 has a zero output; bit shift trigger 84 has a zero output; and bit shift trigger 86 has a one output, AND circuit 91 will be selected and an output will be available therefrom. The output from AND circuit 91 goes to OR circuit 110. OR circuit 110 then provides an output to bit shift AND gate matrix 30. Matrix 30 performs the shift right seven bit position operation. Thus, the incoming data bit has now been shifted seven bits to the right. In order to get the information finally shifted one bit position to the left it would now be necessary to shift the data eight positions to the left. Since there are eight bits in a byte, a shift left one byte operation will solve the problem here.

Accordingly, the AND circuits in AND gate matrix 30 provide outputs which are fed to the OR circuits in working register 16. The particular OR circuits receiving inputs from the AND circuits in gate matrix 30 are labeled beneath each output line for an individual AND circuit in matrix 30; for example, AND circuit 142 provides an output to OR circuit $O_{10}$ in register 16. The OR circuits $O_7$ through $O_{30}$ in working register 16 provide outputs of their own which are fed to byte shift AND gate matrices 40–45 inclusive. In order to shift left one byte, it is necessary to activate the AND circuits in byte shift AND gate matrix 43. Thus, the shift left signal available from direction command trigger 80 is supplied to AND circuit 130. By the same token, each of the byte shift triggers 88 and 90 have zero outputs indicating a shift left one byte operation. These outputs are provided as inputs to AND circuit 130. AND circuit 130 then provides an output signal which, in coincidence with the output signals available from the OR circuits in working register 16, activate the AND circuits in byte shift AND gate matrix 43. These AND gates provide output signals to the OR circuits in output register 22.

Thus, in the previous example the information has been shifted one bit space to the left. This can be verified by noting that data bit 1 which was initially present on line 51 has been shifted over into OR circuit $O_8$ in working register 16 by the operation of bit shift AND gate matrix 30. This data bit 1 was then shifted into OR circuit $O'_0$ in output register 22 by operation of byte shift AND gate matrix 43. OR circuit $O'_0$ is the zero position of the output register. Thus, data bit 1 which was in the one position of the input data has now been shifted to the zero position (i.e., one bit position to the left) in output register 22.

A second example will be given with continued reference to FIGS. *4a–4f*. Consider the situation where it is desired to shift the data bits in the incoming word of information twenty-three positions to the left. To do this would require a bit shift to the right of one position and then a byte shift to the left of three bytes or twenty-four bit positions. Thus, direction command trigger 80 provides initially a shift right instruction and this conditions AND circuits 100–107. Bit shift trigger 82 has a zero output, bit shift trigger 84 has a zero output and bit shift 86 has a one output indicating that a bit shift of one position should be effected. These outputs are provided as inputs to AND circuit 106, which has already been conditioned by an input from direction command trigger 80. AND circuit 106 provides an input signal to OR circuit 122. OR circuit 122 conditions the AND circuits in bit shift AND gate matrix 36. Simultaneous occurrence of data bit signals on lines 50–73 inclusive activates the individual AND circuits within bit shift AND gate matrix 36. Each of these AND circuits provides an output to an associated OR circuit in working register 16. Thus, the incoming data bits of information have been shifted one bit location to the right, and are so positioned in working register 16. In order to accomplish the shift left twenty-three position operation, it now becomes necessary to shift to the left twenty-four positions. Since there are eight bits per byte, this means that a byte shift operation of three byte positions to the left will be necessary.

Direction command trigger 80 provides an output on its one side which is indicative of a shift left operation. This output is provided to AND circuits 130, 132, 134. AND circuit 134 controls the operation of byte shift AND gate matrix 45 which accomplishes the shift left three bytes operation. Further, byte shift trigger 88 has a one output and byte shift trigger 90 has a zero output; both of these outputs are applied to AND circuit 134. AND circuit 134 provides an input to byte shift AND gate matrix 45. The AND circuits within matrix 45, having been conditioned by the outputs from the OR circuits in working register 16, now provide their own outputs. Each AND gate in matrix 45 provides an output to an associated OR circuit in output register 22. For instance, AND gate 170 provides an output to OR circuit $O'_0$. Thus, the data bit of information which originally occupied the twenty-four bit space in the twenty-four bit word has now been shifted twenty-three bit positions to the left and occurs in the zero position of output register 22.

It should be noted that an inverter circuit 180 is disposed between the output from AND circuit 98 and the output from AND circuit 130. Inverter circuit 180 inhibits AND circuit 130 so that a shift left one byte operation will not take place at the same time that a shift left zero bit operation takes place. The addition of the simple inverter circuit allows a more reliable operation of the equipment and programming flexibility.

As set forth initially, the invention may be practiced with a word of information having a length other than twenty-four bits. Certain modifications would then be necessary to the circuitry shown in FIGS. 2, 3, and *4a–4f*. These modifications would be in accordance with the general inventive concept described herein. Further, as noted above, the invention may be practiced with circuitry responsive to either voltage level signals or pulse signals. The selection of basic circuits to accommodate either pulse or level technology is well known in the art.

While the invention has been particularly shown and described with reference to a preferred embodiment thereof, it will be understood by those skilled in the art that the foregoing and other changes in form and details may be made therein without departing from the spirit and scope of the invention.

We claim:

1. Electronic data shifting apparatus for bidirectionally shifting data in bit and byte-size increments comprising in combination:

a source of input data signals;

means for providing control signals representing the amount and direction of data shift;

means jointly responsive to said control signals and to said input data signals for shifting said input data signals in bit-size increments;

means for accepting the shifted input data signals and for providing first output signals;

means jointly responsive to said control signals and to said first output signals for shifting said first output signals in byte-size increments and for providing second output signals, said second output signals comprising a shifted representation of said input data signals.

2. Electronic data shifting apparatus for bidirectionally shifting data in bit and byte-size increments comprising in combination:

input data signals representing bits of data in a word of information;

means for providing a plurality of said input data signals;

control signals representing the amount and direction of data shift;

control means for providing said control signals;

first gating means jointly responsive to said control signals and to said input data signals for shifting said input data signals in parallel bit-size increments;

first output signals representing the shifted input data signals;

storage means for accepting said shifted input data signals and for providing said first output signals;

second output signals representing the completely shifted input data signals; and second gating means jointly responsive to said control signals and to said first output signals for shifting said first output signals in byte-size increments and for providing said second output signals.

3. Electronic data shifting apparatus for bidirectionally shifting data in bit and byte-size increments comprising in combination:

input data signals representing bits of data in a word of information;

means for providing a plurality of said input data signals;

control signals representing the amount and direction of data shift;

control means for providing said control signals;

first gating means jointly responsive to said control signals and to said input data signals for shifting said input data signals in parallel bit-size increments;

first output signals representing the shifted input data signals;

first storage means for accepting said shifted input data signals and for providing said first output signals;

second output signals representing the completely shifted input data signals;

second gating means jointly responsive to said control signals and to said first output signals for shifting said first output signals in byte-size increments and for providing said second output signals; and second storage means for accepting said second output signals.

4. Electronic data shifting apparatus for bidirectionally shifting data in bit and byte-size increments comprising in combination:

input data signals representing bits of data in a word of information;

means for providing a plurality of said input data signals;

control signals representing the amount and direction of data shift;

control means for providing said control signals;

a first plurality of gate circuit matrices, each of said gate circuit matrices being individually responsive to said input data signals and said control signals for shifting said input data signals in parallel bit-size increments;

first output signals available from one said gate circuit matrix having responded to said control signals and said input data signals;

register means for transitorily accepting said first output signals and for providing second output signals;

third output signals representing the completely shifted input data signals;

a second plurality of gate circuit matrices, each of said second gate circuit matrices being individually responsive to said second output signals and said control signals for shifting said second output signals in parallel byte-size increments and for providing said third output signals; and an output register for transistorily accepting said third output signals.

5. Electronic data shifting apparatus for bidirectionally shifting data in bit and byte-size increments comprising in combination:

means for providing a plurality of input data signals having binary values;

a first control means for providing a shift direction command signal;

a second control means for providing signals representing the number of bit-size increments that the input data signals should be shifted;

a first plurality of gate circuit matrices individually responsive to signals from said means for providing input data signals, from said first control means, and from said second control means, one of said matrices responding to shift said input data signals in parallel a certain number of bit positions and to provide first output signals representing the shifted input data signals;

first register means responsive to said first output signals for transitorily accepting said first output signals and providing second output signals representing the shifted input data signals;

a third control means for providing signals representing the number of byte-size increments that said second output signals should be shifted;

a second plurality of gate circuit matrices individually responsive to said second output signals, as well as signals from said first control means and from said third control means, one of said matrices responding to shift in parallel said second output signals a certain number of byte-size positions and to provide third output signals representing the shifted second output signals;

a second register means for transitorily accepting said third output signals and providing fourth output signals representing the now shifted input data signals.

6. Electronic data shifting apparatus for bidirectionally shifting data in a word of information in bit and byte-size increments comprising in combination:

means for providing a pluralty of input data signals having binary values;

a first control means for providing a shift direction command signal, said signal representing a shift left or shift right operation;

a second control means for providing signals representing the number of bit-size increments that the input data signals should be shifted;

a plurality of gate circuit matrices individually responsive to signals from said means for providing input data signals, from said first control means and from said second control means, one of said matrices responding to shift in parallel said input data signals a certain number of bit positions and provide first output signals representing the shifted input data signals;

register means responsive to said first output signals for transitorily accepting said first output signals and providing second output signals representing the shifted input data signals, said register means comprising a plurality of OR gates, the number of said OR gates being at least equal to the number of bit positions in a word of information comprising said input data signals and having an extension of OR circuits, the number of OR circuits in said extension being less than the number of bits in a byte;

a third control means for providing signals representing the number of byte-size increments that said second output signals should be shifted;

a second plurality of gate circuit matrices individually responsive to said output signals, to signals from said first control means, and to signals from said third control means, one of said second plurality of matrices responding to shift in parallel said second output signals a certain number of byte positions and provide third output signals representing the shifted second output signals;

register means responsive to said third output signals for transitorily accepting said third output signals, said register means comprising a number of OR gates equal to the number of bit positions in a word of information.

7. Electronic data shifting apparatus for bidirectionally shifting in bit and byte-size increments the bits of data in a word of information comprising:

means for providing a plurality of input data signals representing the binary value of each bit in a word of information;

a first control means for providing a shift direction command signal;

a second control means for providing signals representing the incremental bit-size shift of said input data signals, said second control means comprising first, a plurality of bistable elements providing first weighted binary output signals, second, a plurality of AND gates individually responsive to different combinations of said first binary output signals and to said shift direction command signal and third, a plurality of OR gates individually responsive to signals available from an individual one of said AND gates for generating first conditioning signals;

a plurality of bit shifting AND gate matrices individually responsive to different ones of said first conditioning signals and said input data signals for shifting in parallel said input data signals a certain number of bit positions and for providing first output signals representing the shifted input data signals, each said gate matrix comprising a plurality of AND gates equal in number to the number of bit positions in a word of information and each said gate matrix shifting the input data signals a different number of bit positions from any other one of said gate matrices;

first register means responsive to said first output signals for transitorily accepting said first output signals and providing second output signals representing the shifted input data signals, said register means comprising a plurality of OR gates, the number of said OR gates being at least equal to the number of bit positions in a word of information, and an extension of OR circuits, the number of OR circuits in said extension being one less than the number of bits in a byte;

a third control means for providing signals representing the incremental byte-size shift of said second output signals, said third control means comprising first a plurality of bistable elements providing second weighted binary output signals, and second a plurality of AND gates individually responsive to different combinations of signals from both said bistable elements and from said first control means for generating second conditioning signals;

a plurality of byte shifting AND gate matrices individually responsive to said second output signals from said first register means and different ones of said second conditioning signals, said AND gate matrices shifting in parallel said second output signals a certain number of byte positions and providing third output signals representing the shifted second output signals, each said gate matrix comprising a plurality of AND gates, the number of AND gates in each matrix being inversely proportional to the number of bytes that each said matrix can shift said second output signals; and register means responsive to said third output signals for transitorily accepting said third output signals, said register means comprising a number of OR gates equal to the number of bit positions in a word of information.

8. Electronic data shifting apparatus for shifting data in bit and byte-size increments to the right comprising in combination:

a source of input data signals;

means for providing control signals representing the amount and direction of data shift;

means jointly responsive to said control signals and to said input data signals for shifting said input data signals in bit-size increments to the right;

means for acepting the shifted input data signals and for providing first output signals;

means jointly responsive to said control signals and to said first output signals for shifting said first output signals in byte-size increments to the right and for providing second output signals, said second output signals comprising a shifted representation of said input data signals.

9. Electronic data shifting apparatus for shifting data to the right in bit and byte-size increments comprising in combination:

input data signals representing a word of information;

means for providing a plurality of said input data signals having binary values;

first control means for providing shift direction command signals, each shift direction command signal representing a shift right operation;

second control means for providing signals representing the number of bit-size increments that said input data signals should be shifted to the right;

a plurality of gate circuit matrices, each matrix being responsive to signals from said means for providing input data signals, from said first control means, and from said second control means, one of said matrices responding to shift in parallel said input data signals a certain number of bit positions to the right and provide first output signals representing the now-shifted input data signals;

register means responsive to said first output signals for transitorily accepting said first output signals and providing second output signals representing the shifted input data signals, said register means comprising a plurality of OR gates, the number of said OR gates being at least equal to the number of bit positions in a word of information and having an extension of OR circuits, the number of OR circuits in said extension being less than the number of bits in a byte;

a third control means for providing signals representing the number of byte-size increments that said second output signals should be shifted to the right;

a second plurality of gate circuit matrices individually responsive to said second output signals, to signals from said first control means and to signals from said third control means, one of said second plurality of matrices responding to shift in parallel said second output signals a certain number of byte positions to the right and provide third output signals representing the shifted second output signals;

register means responsive to said third output signals for transitorily accepting said third output signals, said register means comprising a number of OR gates equal to the number of bit positions in a word of information.

10. Electronic data shifting apparatus for shifting to the right in bit and byte-size increments the bits of data in a word of information, said apparatus comprising in combination:

input data signals representing the binary value of each bit in a word of information;

means for providing a plurality of said input data signals;

a first control means for providing a shift direction command signal, said signal connoting a shift right operation;

a second control means for providing signals representing the incremental bit-size shift of said input data signals, said second control means comprising a plurality of bistable elements providing first weighted binary output signals, a plurality of AND gates individually responsive to different combinations of said first weighted binary output signals and to said shift direction command signal, and further comprising a plurality of OR gates, each said OR gate being individually responsive to signals available from an individual one of said AND gates for generating a first conditioning signal;

a plurality of bit shifting AND gate matrices individually responsive to different ones of said first conditioning signals and said input data signals for shifting in parallel said input data signals a certain number of bit positions to the right and for providing first output signals representing the shifted input data signals, each said gate matrix comprising a plurality of AND gates equal in number to the number of bit positions in a word of information and each said AND gate matrix shifting in parallel the input data signals a different number of bit positions to the right from any other one of said gate matrices;

first register means responsive to said input signals for transitorily accepting said first output signals and providing second output signals representing the right-shifted input data signals, said register means comprising a plurality of OR gates, the number of said OR gates being at least equal to the number of bit positions in a word of information and having an extension of OR circuits, the number of OR circuits in said extension being one less than the number of bits in a byte;

a third control means for providing signals representing the incremental byte-size shift to the right of said second output signals, said third control means comprising a plurality of bistable elements providing second weighted binary output signals, and a plurality of AND gates individually responsive to different combinations of signals from said bistable elements and to signals from said first control means for generating second conditioning signals;

a plurality of byte shifting AND gate matrices individually responsive to said second output signals from said first register means and different ones of said second conditioning signals, said AND gate matrices shifting in parallel said second output signals a certain number of byte positions to the right and providing third output signals representing the shifted second output data signals, each said gate matrix comprising a plurality of AND gates, the number of AND gates in each matrix being inversely proportional to the number of bytes that each said matrix can shift said second output signals; and register means responsive to said third output signals for transitorily accepting said third output signals, said register means comprising a number of OR gates equal to the number of bit positions in a word of incoming data.

11. Electronic data shifting apparatus for shifting data to the left in bit and byte-size increments comprising in combination:

a source of input data signals;

means for providing control signals representing the amount and direction of data shift;

means jointly responsive to said control signals and to said input data signals for shifting said input data signals in bit-size increments to the right;

means for accepting the shifted input data signals and for providing first output signals;

means jointly responsive to said control signals and to said first output signals for shifting said first output signals in byte-size increments to the left and for providing second output signals, said second output signals comprising a shifted representation of said input data signals.

12. Electronic data shifting apparatus for shifting data to the left in bit and byte-size increments comprising in combination:

input data signals representing a word of information;

means for providing a plurality of said input data signals having binary values;

a first control means for providing a shift direction command signal, said signal representing a shift left operation;

a second control means for providing signals representing the number of bit-size increments that said input data signals are to be overshifted to the right;

a plurality of gate circuit matrices individually responsive to signals from said means for providing input data signals, from said first control means and from said second control means, one of said matrices responding to overshift in parallel said input data signals a certain number of bit positions to the right and to provide first output signals representing the shifted input data signals;

register means responsive to said first output signals for transitorily accepting said first output signals and providing second output signals representing the shifted input data signals, said register means comprising a plurality of OR gates, the number of said OR gates being at least equal to the number of bit positions in a word of information and having an extension of OR circuits, the number of OR circuits in said extension being less than the number of bits in a byte, so that significant bits of data will not be lost in the shift right suboperation;

a third control means for providing signals representing the number of byte-size increments that said second output signals should be shifted to the left;

a second plurality of gate circuit matrices individually responsive to said output signals, to signals from said first control means, and to signals from said third control means, one of said second plurality of matrices responding to shift in parallel said second output signals a certain number of byte positions to the left and to provide third output signals representing the shifted second output signals; and register means responsive to said third output signals for transitorily accepting said third output signals, said register means comprising a number of OR gates equal to the number of bit positions in a word of information.

13. Electronic data shifting apparatus for shifting to the left in bit and byte-size increments the bits of data in a word of information, said apparatus comprising in combination:

input data signals;

means for providing a plurality of said input data signals, each said signal representing the binary value of each bit in a word of information;

a first control means for providing a shift direction command signal, said command signal indicating a shift left operation;

a second control means for providing signals representing the incremental bit-size shift of said input data signals, said second control means comprising a plurality of bistable elements providing first weighted binary output signals, a plurality of AND gates individually responsive to different combinations of said binary output signals and said shift direction command signal, and said control means further comprising a plurality of OR gates individually responsive to signals available from an individual one of said AND gates for generating a first conditioning signal;

a plurality of bit shifting AND gate matrices individually responsive to different ones of said first conditioning signals and said input data signals for overshifting in parallel said input data signals a certain number of bit positions to the right and for providing first output signals representing the shifted input data signals, each said gate matrix comprising a plurality of AND gates equal in number to the number of bit positions in a word of information and each said gate matrix shifting the input data signals a different number of bit positions from any other one of said gate matrices;

first register means responsive to said first output signals for transitorily accepting said first output signals and providing second output signals representing the overshifted input data signals, said register means comprising a plurality of OR gates, the number of said OR gates being at least equal to the number of bit positions in a word of information, said register having an extension of OR circuits, the number of OR circuits in said extension being one less than the number of bits in a byte so that significant bits of data will not be lost in the overshift suboperation;

a third control means for providing signals representing the incremental byte-size shift to the left of said second output signals, said third control means comprising a plurality of bistable elements providing second weighted binary output signals, comprising a plurality of AND gates individually responsive to different combinations of signals from said bistable elements and to the shift left signals from said first control means, said third control means generating second conditioning signals;

a plurality of byte shifting AND gate matrices individually responsive to said second output signals from said first register means and different ones of said second conditioning signals, said AND gate matrices shifting in parallel said second output signals a certain number of byte positions to the left and providing third output signals representing the completely-shifted second output signals, each said gate matrix comprising a plurality of AND gates, the number of AND gates in each matrix being inversely proportional to the number of bytes that each said matrix can shift said second output signals; and register means responsive to said third output signals, for transitorily accepting said third output signals, said register means comprising a number of OR gates equal to the number of bit positions in a word of information.

14. Electronic data shifting apparatus of the type set forth in claim 7 wherein said third control means comprises an additional means for disabling said byte shift circuitry during a shift left zero bit operation.

References Cited by the Examiner

UNITED STATES PATENTS

| | | | |
|---|---|---|---|
| 3,076,181 | 1/1963 | Newhouse et al. ---- | 340—172.5 |
| 3,103,580 | 9/1963 | Foreman ----------- | 235—159 |

ROBERT C. BAILEY, *Primary Examiner.*

P. L. BERGER, P. J. HENON, *Assistant Examiners.*